United States Patent
Job et al.

[15] 3,650,874
[45] Mar. 21, 1972

[54] ADHERING RUBBERS AND POLYOLEFINES BY OTHER THAN PEROXIDE CURING AGENTS

[72] Inventors: Claude Job, Paris; Yvan Landler, Sceaux; Pierre Henri Lebel, Reuil-Malmaison; Lucile Meillat, Paris, all of France

[73] Assignee: Pneumatiques, Caoutchouc Manufacture et Plastiques Keber-Colombes, Colombes (Hauts de Seine), France

[22] Filed: Mar. 6, 1969

[21] Appl. No.: 804,915

Related U.S. Application Data

[63] Continuation-in-part of Ser. No. 523,558, Jan. 28, 1966, abandoned.

[30] Foreign Application Priority Data

| Mar. 15, 1968 | France | 144124 |
| Mar. 15, 1968 | France | 144126 |
| Mar. 15, 1968 | France | 144127 |
| Mar. 15, 1968 | France | 144128 |
| Nov. 6, 1968 | France | 172836 |

[52] U.S. Cl. ..........161/217, 156/306, 156/308, 156/309, 156/335, 161/88, 161/216, 161/242, 161/252, 161/253
[51] Int. Cl. ...............B32b 15/02, B32b 25/08, C09j 3/14
[58] Field of Search..............161/216, 217, 242, 252, 255, 161/88; 156/334, 308, 309, 335

[56] References Cited

UNITED STATES PATENTS

| 3,013,915 | 12/1961 | Morfan | 161/93 |
| 3,296,061 | 1/1967 | Tavenor et al. | 161/240 |
| 3,347,817 | 10/1967 | Gladding et al. | 260/41.5 |
| 3,367,909 | 2/1968 | Hay et al. | 260/45.95 |
| 3,406,732 | 10/1968 | Milano et al. | 161/252 |

FOREIGN PATENTS OR APPLICATIONS

| 865,806 | 4/1961 | Great Britain | 156/110 A |

Primary Examiner—John T. Goolkasian
Assistant Examiner—C. B. Cosby
Attorney—Holcombe, Wetherill & Brisebois

[57] ABSTRACT

A rubber is bonded to a polyolefine by placing on the rubber a layer of polyolefine of melt index less than 0.15 and applying heat and pressure. If the rubber is an unvulcanized mix containing a vulcanizing agent, the temperature, pressure and duration should be sufficient to cause vulcanization of the rubber. If the rubber is partly or fully vulcanized the pressure used is at least 10 kg./cm.$^2$ and the polyolefine is heated to at least its melting point. The low melt index polyolefine may be in the form of a powder, powder suspension, film or sheet, which can thus be used to adhere a higher melt index polyolefine to the rubber. Various integral rubber/polyolefine articles are produced by this method.

30 Claims, 9 Drawing Figures

PATENTED MAR 21 1972

ADHERING RUBBERS AND POLYOLEFINES BY OTHER THAN PEROXIDE CURING AGENTS

This application is a continuation-in-part of pending application ser. No. 523,558 filed Jan. 28, 1966 now abandoned.

The present invention relates to a method for bonding a rubber to a polyolefine, to novel adhesives for these materials and to the products obtained thereby.

It is known that certain materials e.g., some metals, can be made to adhere easily to certain rubbers but not to others. Also certain materials, e.g., rubbers and metals, are difficult to adhere to polyolefines and certain rubbers are difficult to bond to other rubbers.

For example when rubber articles, comprise various parts, each part having a different function, it is advantageous that the various parts be made from rubbers of different types, but nevertheless it is necessary that the whole article be vulcanized at the same time so as to obtain a product of constant quality without increasing the cost of manufacture.

Unfortunately, this is only possible if the different rubbers are compatible, i.e., if they adhere intimately together during the vulcanization process; thus one is often obliged not to use particular rubbers, although they possess more suitable properties, because they are incompatible.

It is known in certain cases to overcome this difficulty by arranging between two incompatible rubber elements an intermediate sheet of a rubber which is compatible with both, but this method, which is not always applicable, increases the cost of manufacture and is complicated.

Similarly polyolefines have a group of characteristics which, in numerous cases, make them preferred coating materials if it is known how to make them adhere to metals and to other materials by means of simple and inexpensive processes; among these characteristics one may mention their heat-weldability, their low coefficient of friction, their great chemical inertness which causes them to be little or none corrodible and their good abrasion resistance.

But the processes used or proposed up to the present to make them adhere to metal, are expensive, difficult to put into practice industrially, and, often, do not give a sufficient adherence for products comprising a part coated with polyolefine to be able to withstand fairly severe service conditions.

For this reason, polyolefines are only bound to metals at present in certain particular cases, this binding being effected, mostly, by riveting or after adapting the metallic surface for mechanical attachment of the polyolefine.

It is a general object of the present invention to provide a method for effecting adhesion between materials of the aforementioned types which overcome the above difficulties.

It is also an object of the invention to provide an improved method for bonding a rubber to a polyolefine.

It is also an object of the invention to provide new adhesives which permit rubbers of different and incompatible materials, polyolefines and metals easily to adhere together.

It is another object of the invention to provide a method for causing elements of incompatible rubbers to adhere during vulcanization.

It is a further object of the present invention to provide a simple process, inexpensive, easy to put into practice industrially, enabling polyolefine to be strongly adhered to metals and, in a general manner, to all materials to which it is known to make rubber adhere.

It is another object of the invention to provide new industrial products comprising at least a part of rubber and at least a part of polyolefine, in the manufacture of which the process, which is one of the objects of the invention, finds a particularly advantageous application.

It is another object of the present invention to provide articles of rubber of which the surface qualities are modified, especially by increasing their abrasion resistance, their coefficient of friction and their chemical inertness, and to render them heat-weldable.

It is a further object of the invention to provide an improved process of manufacturing articles of rubber with modified surface qualities.

It is another object of the invention to provide an adhesive product for use in the process described constituted by a film of polyethylene of low melt index of which one face is coated with a vulcanizable mixture of rubber.

Other objects and advantages of the invention will emerge from the description which follows.

The essential concept of the invention resides in the unexpected discovery that rubber can be bonded to a polyolefine having a melt index less than 0.15 by contacting the rubber and the polyolefine, applying pressure and heat, the rubber being previously partly or fully vulcanized or being vulcanized during the bonding.

It has been discovered that by vulcanizing an element of a mixture containing a rubber and a vulcanizing agent under the usual conditions of vulcanization for this mixture, on certain polyolefines and by exerting a sufficient pressure of the order of at least 2 to 5 kg., the adherence between the rubber element and the polyolefine is excellent and that by placing said polyolefine between two elements one of which is rubber and the other of a material adhered to the polyolefine, e.g., rubber, or another polyolefine, these elements may be made to adhere securely to one another simply by vulcanization.

This is surprising because polyolefines are known to lack affinity for rubbers; in fact, it is known to use them, under conditions of ambient temperature, for preventing two superimposed sheets of rubber from sticking together. The problem set by the production of articles comprising both a rubber and a polyolefine has never been solved in a satisfactory manner despite the numerous methods which have been proposed for this purpose.

The majority of prior methods are based on the use of peroxides which produce at the same time cross-linking of the rubber and the polyolefines with the formation of bonds between one another. These peroxides are placed between the rubber and the polyolefine by coating or in any other manner; alternatively they may be mixed with the polyolefines or with the rubber for which they then serve as a vulcanizing agent.

However, it is desirable to avoid as far as possible vulcanizations by peroxides which, as is well-known, are explosive and hence less practical than other vulcanizing agents and always reduce the mechanical qualities of the vulcanized rubber.

In other methods, there is inserted between the rubber and the polyolefine an intermediate layer which is composed of a polyolefine containing a peroxide or one or more intermediate layers composed of a mixture of rubber, polyolefine and acid carbon black or a layer composed of a totally or partially hydrogenized polybutadiene, i.e., a substance which is a polyolefine or which is close in structure thereto.

Thus, by means of various artificial media, attempts have been made to cause a polyolefine to adhere to rubber, with doubtful results, but it has never been envisaged that by selecting certain polyolefines, they may be simply made to adhere to the rubber under the conditions of pressure and of temperature under which vulcanization is effected for most rubber articles and that the adherence is so good that these polyolefines may act as adhesives between mixtures i.e., unvulcanized rubber mixes, based on diverse pairs of incompatible rubbers. It is interesting in this matter to note that the physiochemical phenomena which occur in the rubber during the vulcanization have no influence on the polyolefine.

It has also been surprisingly found that the same polyolefines permitted adhesion to be effected between elements composed of vulcanized rubber with the proviso that the polyolefine is taken to a temperature higher than the melting temperature and that the pressure exerted is greater than 10kg./cm.$^2$.

The polyolefines which permit this good adherence to be obtained are polyolefines whose melting index is lower than 0.15.

By polyolefine, is to be understood a polymer or a copolymer of one or more mono-olefines having no more than four carbon atoms as well as mixtures of these polymers and/or copolymers between themselves.

By melting index, is to be understood the melting index measured according to the standard ASTM 1238–57 T modified by adding a supplementary load of 3 kg.

The polyolefines which correspond to the condition of having a melting index lower than 0.15 have a high molecular weight which, measured by the method of light diffusion, is greater than 600.000.

By rubber, is to be understood vulcanizable mixtures whose elastomer is a natural or synthetic rubber or a mixture of one and the other. Among synthetic rubbers to which the invention may be applied, mention may be made of poly-cis 1–4 isoprene, poly-cis butadiene, ethylene-propylene copolymers, terpolymers of ethylene-propylene with a non-conjugated dienic monomer, styrene-butadiene copolymers (SBR), terpolymers of butadiene-acrylonitrile, butadiene-acrylonitrile copolymers with a monomer having carboxylic functions, polychloroprenes such as those known under the commercial name of "Neoprene," isobutylene-isoprene copolymers (butyl rubber), chlorosulfo polyethylenes such as those known under the commercial name of Hypalon, derivatives of the preceding polymers, and mixtures thereof.

An excellent adhesion is obtained whatever may be the vulcanizing agent contained in the mixture but it is notable and surprising that this adhesion exists and is just as good when the vulcanizing agent is not a peroxide.

The above defined low melt index polyolefines may be used in various forms such as powder suspension, coating, film or sheet.

If it is desired to cause the adherence of parts made of non-vulcanized rubber, a layer of polyolefine having a melting index lower than 0.15 is arranged between the different parts, the parts are assembled and vulcanization is proceeded with under the usual conditions for these rubbers.

If it is desired to effect the adhesion between rubber parts which are completely or partially vulcanized, the procedure set out above is followed but the polyolefine is taken to a temperature higher than the melting temperature and the pressure on the parts in contact is made higher than 10kg./cm.². In order to take the polyolefine to the desired temperature, the whole of the assembly may be heated or the faces of the parts which will be in contact with the polyolefine are previously heated, for example.

The same polyolefines may be used for causing adhesion between a part composed of a polyolefine whose melting index is higher than 0.15 and an element made of rubber or made of another polyolefine of melting index higher than 0.15. In this case, the same procedure is followed as when the parts are made of rubber.

In the same manner a material to which polyolefines do not adhere well, may be coated with a layer of rubber which adheres well to the said material and the polyolefine then bonded to the rubber by the method according to the invention.

In order that the invention may be more clearly understood various embodiments thereof are described below purely by way of illustrative but non-limiting example, with reference to the accompanying schematic drawings, not necessarily to scale, in which.

In some of the examples described below, two parts are made to adhere but is is understood that the invention is applicable however many parts are desired to be adhered.

The quantities of ingredients are parts by weight and the resistance to tearing, expressed in kg./cm., have been measured according to the indications of the standard ASTM:D 1004–49T.

EXAMPLE 1

This example shows the adhesion which may be obtained between a rubber, exemplified by a polychloroprene, and a sheet of polyethylene having a very low melting index.

The mixture of polychloroprene, prepared by the Banbury method, has the following composition:

| | | |
|---|---|---|
| Polychloroprene | 120 | p.b.w. |
| Phenyl naphthylamine | 2.4 | p.b.w. |
| Magnesium oxide | 4.8 | p.b.w. |
| Oil | 12 p.b.w. | |
| Stearine | 0.6 | p.b.w. |
| Carbon black of the HAF type | 50 | p.b.w. |
| Sulfur | 1.2 | p.b.w. |
| Di-ortho-tolyl-guanidine | 0.9 | p.b.w. |
| Tetramethylthiuram monosulfide | 0.9 | p.b.w. |

This mixture is placed in a mold in which has been placed a sheet of 2 mm. thickness of low pressure polyethylene of density 0.94 having a melting index of 0.01 and a melting temperature of 125° C. as known under the commercial name of Hostalen GU.

The mold is heated for 40 minutes at 151° C. under a pressure of 20 kg./cm.². After emptying the mold, a composite product formed of rubber and polyethylene is obtained; the resistance to tearing is 5.6 kg./cm., this value being similar to the resistance to tearing of the polychloroprene which is vulcanized alone.

The same mixture of polychloroprene vulcanized under the same conditions with a sheet of 2mm. thickness of low pressure polyethylene, of density 0.94, having a melting index of 4 and a melting temperature of 125° C. has a zero resistance to separation.

EXAMPLE 2

This example shows how two rubbers, reputed to be incompatible, i.e., a natural rubber and ethylene-propylene terpolymer rubber, can be made to adhere in a single vulcanization. Two mixtures A and B having the following compositions are prepared on the mixer:

| | | |
|---|---|---|
| Mixture A | | |
| Terpolymer of ethylene-propylene with a nonconjugated diene, such as the rubber known under the commercial name of ESSO 3509 | 300 | p.b.w. |
| Stearine | 3 | p.b.w. |
| Zinc oxide | 15 | p.b.w. |
| Aromatic oil | 45 | p.b.w. |
| Carbon black, of the HAP type | 150 | p.b.w. |
| Mercaptobenzothiazole | 1.5 | p.b.w. |
| Tetramethythiurame monosulfide | 4.5 | p.b.w. |
| Sulfur | 5.7 | p.b.w. |
| Mixture B | | |
| Natural rubber | 95 | p.b.w. |
| Carbon black of FAF type | 46 | p.b.w. |
| Diphenylamine | 0.4 | p.b.w. |
| Phenyl naphthylamine | 0.4 | p.b.w. |
| Aromatic oil | 3 | p.b.w. |
| Zinc oxide | 8 | p.b.w. |
| N-N′ diethylthicarbamyl sulfide | 3 | p.b.w. |
| Sulfur | 2.5 | p.b.w. |

The mixture A is introduced in sheet form into a mold, a film of 0.1 mm. thickness of the same polyethylene as that of Example 1 is positioned on the mixture A, then the mold is filled with the mixture B in sheet form.

The mold is then heated for 40 minutes at 143° C. under a pressure of 20 kg./cm. There is obtained, after removal from the mold, a composite product of which the tear resistance is 14 kg./cm., a value analogous to the tear resistance of vulcanized natural rubber itself.

The same mixtures were covulcanized under the same conditions, but separated by a foil of 0.1 mm. thickness of low pressure polyethylene of 0.94 density having a melting index of 5 and a fusion temperature of 122–125° C. from a composite product of which the resistance to separation is nil.

EXAMPLE 3

This example shows how a good adhesion can be obtained between a butyl rubber and a styrene butadiene rubber although the two rubbers are normally incompatible.

Each of the following two mixtures is prepared on a cylinder mixer:

Mixture A

| | | |
|---|---|---|
| Butyl rubber | 200 | p.b.w. |
| Stearine | 3 | p.b.w. |
| Zinc oxide | 10 | p.b.w. |
| Oil | 8 | p.b.w. |
| Carbon black of FAF type | 113 | p.b.w. |
| Paraffin | 6 | p.b.w. |
| Zinc diethyldithiocarbamate | 2 | p.b.w. |
| Tetramethylthiuram disulfide | 5 | p.b.w. |
| Sulfur | 3 | p.b.w. |

Mixture B

| | | |
|---|---|---|
| Styrene-butadiene rubber known under the commercial names of | | |
| a. SBR 1509 a styrene-butadiene copolymer, with about 23% styrene, resulting from a so-called cold polymerization | 75 | p.b.w. |
| b. SBR-SX 371, a styrene-butadiene-divinyl benzene copolymer | 25 | p.b.w. |
| Oil | 22.5 | p.b.w. |
| Black of the FEF Type | 75 | p.b.w. |
| Chalk | 50 | p.b.w. |
| N-cyclohexylbenzothiazole-2-sulfenamide | 1.2 | p.b.w. |
| Zinc oxide | 5 | p.b.w. |
| Stearic acid | 1 | p.b.w. |
| Sulfur | 2 | p.b.w. |

One of the two mixtures, a sheet of polyethylene identical to that of Example 2 and the other mixture are successively introduced into a mold in sheet form.

A pressure of 15k./cm.² is exerted and the mold is heated for 20 minutes at 160° C.

The resistance to tearing of the product obtained is 4kg./cm., this value being similar to the resistance of the vulcanized sytrene-butadiene rubber.

If no film of polyethylene or if a sheet of polyethylene with a melting index of 0.2 is placed in position, the resistance to tearing is zero.

EXAMPLE 4

The two rubbers A and B of Example 3 are vulcanized separately in the form of sheets.

The two sheets are superimposed in a mold by inserting a powder of the same polyethylene as in Example 1, and heating is effected for 10 minutes at 160° C. while exerting a pressure of 15 kg./cm.².

The resistance to tearing of the composite product obtained is 3.8 kg./cm., i.e., of the same order as that of the composite product obtained in Example 3.

EXAMPLE 5

This example shows that a rubber vulcanized with peroxide can be made to adhere to a rubber vulcanized with sulfur.

A mixture having a base of natural rubber, identical to the mixture A of Example 3 is prepared. The following mixture with a base of ethylene-propylene copolymer is also prepared:

| | | |
|---|---|---|
| Ethylene-propylene copolymer marketed by Montecatini and known under the commercial name of Dutral N | 300 | p.b.w. |
| Triethanolamine | 1.5 | p.b.w. |
| Zinc oxide | 15 | p.b.w. |
| Oil | 15 | p.b.w. |
| Carbon black, of the HAF type | 135 | p.b.w. |
| Benzene paradi (isopropylparoxy-tertiobutyl) | 17.7 | p.b.w. |
| Sulfur | 1.35 | p.b.w. |

The natural rubber in sheet form, a powder of a polyethylene whose melting index is 0.13 and melting temperature 130° C., and the ethylene propylene copolymer in sheet form, are placed in a mold.

The mold is then heated for 20 minutes at 160° C. at a pressure of 20kg./cm.².

The product obtained has a resistance to tearing of the order of 4kg./cm.

If the polyethylene powder is replaced by a low pressure polyethylene powder, of density 0.94, and having a melting index of 0.25 and a melting temperature of 127° to 131° C., the resistance to tearing is only 0.5 kg./cm.².

EXAMPLE 6

A mixture is prepared having a base of butyl rubber identical to that of Example 3.

This mixture, a sheet of polyethylene identical to that of Example 1, and a sheet of a polyethylene of density 0.95, of melting index 5 and whose melting temperature is 130° C., are placed in a mold.

A pressure of 5 kg./cm.² is exerted and heating is effected at 145° C. for 20 minutes.

The composite product obtained has a resistance to tearing of 3.9 kg./cm.

EXAMPLE 7

There is produced in an internal mixer the mixture of the following composition:

| | |
|---|---|
| Polybutadiene containing 96.5% of poly-cis 1,4 butadiene (sold by Shell under the designation Coriflex) | 100 parts by weight |
| Carbon black, type ISAF | 50 parts by weight |
| Aromatic oil sold under the trademark Dutrex V10 | 8 parts by weight |
| Zinc oxide | 5 parts by weight |
| Stearic acid | 2 parts by weight |
| Antioxidant | 2 parts by weight |
| Sulphonamide accelerator | 0.8 parts by weight |
| Sulfur | 0.8 parts by weight |

A sheet of the preceding mixture is placed in a mold; there is then laid thereon a layer of polyethylene of low pressure type and melt index less than 0.04, the said layer having an approximate thickness of 0.5 mm.

On this layer of polyethylene there is placed, a sheet of the following mixture:

| | |
|---|---|
| Chlorosulphonated polyethylene (sold by Du Pont de Nemours under the designation Hypalon 40) | 600 parts by weight |
| Magnesia | 72 parts by weight |
| Chalk | 617 parts by weight |
| Dioctylphthalate | 132 parts by weight |
| Titanium oxide | 37.5 parts by weight |
| Pentaerythritol | 180 parts by weight |
| Tetrone A | 12 parts by weight |

The whole is vulcanized for 20 minutes at a temperature of 160° C. and under a pressure of 5 kg./cm.².

There is obtained a laminated product in which the sheet based on polybutadiene and that based on chlorosulphonated polyethylene are firmly bonded to one another. The resistance to separation could not be measured, one of the two sheets tearing before separation is produced.

EXAMPLE 8

A sheet formed in the mixture A of Example 2 is painted by a brush with the emulsion of which the composition is as follows:

Polyethylene of melt index less than

| | |
|---|---|
| 0.05 (particles of diameter not exceeding 100µ) | 80 parts by weight |
| Acetone | 90 parts by weight |
| Methanol | 10 parts by weight |
| Thickening agent (sold by B.F. Goodrich under the name Carbopol) "Carbopol, a water soluble carboxypolymethylene" | 0.1 parts by weight |

It is allowed to dry in the open air, under ambient conditions, for 30 minutes.

There is then applied a sheet of the natural rubber mixture B of Example 2 and the whole is vulcanized for 30 minutes at 150° C. under a pressure of 6 kg./cm.$^2$.

The adhesion between the sheet formed in mixture A and that formed in mixture B is such that it was not possible to measure the resistance to separation, a tear appearing before the first signs of separation.

The invention finds application in all the fields where it is required to use simultaneously different rubbers in one article, for example tires whose carcass, breaker layer, tread or sides may be made of different rubbery mixtures; conveyor belts having a special coating against wear or heat; conveyor belts comprising an anti-friction layer; pipes and other articles.

Thus, the invention also relates to products comprising a layer of any vulcanized rubber bonded to a layer of polyolefine whose melting index is lower than 0.15, as well as to products utilizing such a polyolefine as an intermediary between two different rubbery mixtures. It also relates more particularly to assemblies comprising a layer of elastomer and a layer of polyethylene, where the latter is used in such a thickness that it reinforces the mechanical properties of the rubbery assembly.

In certain cases, the use of a powder, of a sheet or of a film is delicate because it is difficult to deposit a uniform layer of powder or because it is difficult to maintain the film in place.

In another embodiment of the method according to the invention for effecting adhesion between at least two materials, for the production of an assembly comprising one or several parts of rubber, at least one relatively thin layer of a polyolefine of low melt index is applied in the form of a suspension.

Provided that the particles do not exceed a maximum size, for example 100µ, such suspensions may be easily prepared according to the methods well-known to one skilled in the art and remain stable over time.

EXAMPLE 9

A sheet of mixture B of Example 2 is painted with the same emulsion as that of the preceding Example.

The emulsion is allowed to dry under ambient conditions for a time of the order of 30 minutes and then, for 40 minutes the whole is subjected to a temperature of 145° C. and a pressure of 3 kg./cm.$^2$.

There is thus obtained a sheet of vulcanized rubber, coated with a skin of polyethylene adhering to the rubber and having no trace of discontinuity; the coefficient of friction of the surface of the sheet coated with polyethylene is very low and its resistance to abrasion very good.

EXAMPLE 10

In a mixture containing by weight 90 parts of acetone and 10 parts of methanol, there is added 0.1 part of a thickening agent, like that known under the commercial designation "Carbopol," and there are dispersed 80 parts of polyethylene of melt index less than 0.05 of which particles have a maximum diameter of 100µ.

To obtain a better dispersion of polyethylene, one may, before its incorporation, moisten it by means of water containing a wetting agent, such as sodium alkyl aryl sulfonate.

It goes without saying that the proportion above of thickening agent is only given by way of indication; it depends not only on the thickening agent used but also on the viscosity that it is desired to give to the suspension. Thus, in adding, to the preceding mixture, 1 part of, Carbopol, in place of 0.1 part, there is obtained a true paste, which, in certain cases, enables an easier utilization than that of more liquid dispersions.

The dispersions or pastes are applied on the rubber surfaces in a manner that after drying, there remains a continuous layer, of desired thickness, of polyolefine of low melt index. If necessary, this may be done several times, each application only being made after drying the previously applied layer.

The operation of the method according to the invention by using polyolefine in the form of powder or of film, may be difficult in certain circumstances because of the existing material which is not adapted or is poorly adapted to employment of these products.

In fact, the use of powder calls on particular techniques which are not necessarily familiar to rubber specialists and necessitate a special material.

The use of a film frequently comes up against the difficulty that the film, simply positioned, does not have any adherence with respect to the rubber; this absence of adhesion and of gluing causes difficulty in maintaining it in position during the operations of fabrication which precede molding and vulcanization.

The following describes embodiments of the invention which enable the putting into operation of the process described under conditions with a material customary in the rubber industry.

In these embodiments there is provided an adhesive product for use in the process described intended to cause two rubbers to adhere together, even if incompatible, said product being constituted by a film of a polyolefine of low melt index of which one face at least is coated with a vulcanizable mixture of rubber.

The polyolefine film of low melt index of which the thickness is generally greater than 0.1 mm., a known product, for example, produced by extrusion; the layers of vulcanizable mixture of rubber situated on both sides of the film of polyethylene have a thickness generally greater than 0.01 mm.

The application, on the film, of the one or more layers of vulcanizable mixture may be done by passage on a calendar under conditions of temperature and pressure which enable a satisfactory hold to be obtained of these rubbers on the polyolefine film.

By vulcanizable mixture of rubber is understood any vulcanizable mixture comprising one or several natural and synthetic rubbers.

In a general way the vulcanizable mixtures of rubber, which occur on both faces of the polyolefine film of low melt index, are different by the nature of the one or more rubbers that they comprise. It is, mostly, of advantage to cover one of the faces of the film with a vulcanizable mixture of rubber compatible with a while category of rubbers and to cover the other face of the film by a vulcanizable mixture of rubber compatible with another series of rubbers. As will be seen from the following, the choice of rubbers entering into the mixtures covering the film of polyolefine depends on the rubbers with which they must be placed in contact during fabrication of the products. There must, in fact, here be a compatibility between the ones and the others.

The manner in which the adhesive product, according to the invention, may be manufactured and used will be described in more detail by means of examples of application having regard to the fabrication of transporter belts; they will show also how the adhesive product enables the easy production of assemblies which were known to be desirable but difficult or impossible to realize.

EXAMPLE 11

"This Example relates to the manufacture of a transporter band" to prepare the adhesive product, there was used a film having 0.4 mm. of thickness of a low pressure polyethylene having a density of 0.94 and a melt index of 0.01. Making it pass into a calendar of four cylinders, there was applied on one of its faces the mixture 1, of which the composition is the following:

|  | Parts by weight |
|---|---|
| natural rubber | 100 |
| black FEF | 35 |
| plasticizer | 10 |
| stearic acid | 1.3 |
| zinc oxidant | 5 |
| antioxidant | 2 |
| sulfur | 2.5 |
| tetramethyl thiurame disulfide | 1.3 | and on the other face the mixture 2, of which the composition is the following:

|  | Parts by weight |
|---|---|
| ethylene-propylene rubber known under the name Dutral | 100 |
| mineral plasticizer | 10 |
| antioxidant | 0.5 |
| SAF black | 60 |
| 40% peroxide | 7 |
| sulfur | 0.6 |

It should be noted that no natural adherence exists between these mixtures and the polyethylene film, but, at least, the conditions of pressure and of temperature during the passage on the calendar, enable, failing a true adhesion, a satisfactory grip of these mixtures on the polyethylene film to be obtained.

The core having been coated, by passage on the calendar, with a mixture of rubber identical with mixture 1, there is placed, on both sides of this carcass, the film previously prepared and coated with mixtures of rubber by making the face bearing the mixture 1 comes into contact with the carcass and the face bearing the mixture 2 occurs on the outside.

This operation is done without difficulty with the existing material in most manufacturing units of transporter bands and the rubber mixture which coats the film sticks sufficiently to the rubber of the carcass so that the polyethylene film is not displaced during the following operations.

Subsequently, coatings are placed above and below the transporter band, for example by a passage on the calendar. These coatings are, of a mixture identical with the preceding mixture 2.

The transporter band is then vulcanized under pressure during 10 minutes to 160° C. During this latter operation the film polyethylene creates the adhesion between the coatings and the carcass.

On test intended to measure the adherence between the coatings and the rubber covering the carcass it is noted that the rubber is torn off before the bond due to the film of polyethylene yields.

Also, as a result of the product of the invention, there has been produced, easily and with the usual existing material, a transporter band of which the coatings, of ethylene-propylene, have especially very high resistance to ageing and to the chemical agents inherent in this type of rubber.

EXAMPLE 12

In another Example also in connection with the manufacture of a transporter band, there is used for coating one of the faces of the film of polyolefine and for forming the carcass, the same mixture 1 as previously. On the other hand, a mixture 2 Bis, was used, for coating the other face of the film and to constitute the coatings of the band. The composition of this mixture 2 Bis is the following:

|  | Parts by weight |
|---|---|
| butyl rubber | 100 |
| black | 50 |
| zinc oxide | 5 |
| oil plasticizer | 12 |
| sulfur | 2 |
| mercaptobenzolthiazole-sulfide | 0.5 |

By proceeding as previously there is obtained a transporter band of which the coatings of butyl rubber adhere perfectly to the carcass and which is capable of being used at high temperatures.

In these embodiments, the mixtures of rubber coating the film of polyolefine are identical with the mixtures of rubber with which they are in contact during the manufacture of the band. This is not always necessary and it suffices for the rubber entering into the mixture coating one of the faces of the film of polyolefine to be compatible with the mixture of rubber with which it will be in contact. Thus a same film of polyolefine of which the faces bear vulcanizable mixtures of different rubbers may be used in the manufacture of different products.

The invention includes assemblies between an elastomeric layer and a polyolefine layer, the latter being used in a thickness such that it reinforces the mechanical properties of a rubbery assembly.

Up to the present, reinforced rubber products have used reinforcements of textile materials, of metal or iron, all of which have the disadvantages of being expensive, of requiring a special treatment for adhesion and, certain of them being sensitive to atmospheric conditions when the rubber coverings are damaged.

It is an object of the invention to provide reinforced rubber products free of the aforesaid disadvantages.

Among the products of rubber capable of being reinforced by elements of a polyolefine of low melt index, there may be mentioned particularly transmission belts and pipes.

In these products, the reinforcement of polyolefine of low melt index may be in the form of a continuous layer resulting, for example, from the positioning of a sheet during the operations of fabrication. For example, the tube shown in section in FIG. 1 comprises a reinforcement 1 which is a cylinder of polyolefine of low melt index. To produce this tube, there is, during the operation of fabrication, rolled in a helix on the inner tube 2, which is then on a rod, and band having a thickness of 0.9 mm. made of the polyethylene known under the name Hostalene GU having a melt index less than 0.05; the winding has been done in a manner such that the spirals overlap over a part of their width and thus form a continuous surface. Consequently, the outer part 3 has been placed in position, the tube has been lashed and vulcanized for 15 minutes at 160° C.

Figure 1:
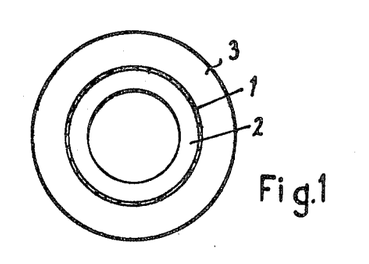
FIG. 1 shows in longitudinal section one embodiment of a tube reinforcement according to the invention.

It will be noted that, if the inner tube 2 and the outer part 3 are made of incompatible rubbers, the cylinder 1 assures both the binding between one and the other and the reinforcement of the tube. But it is not necessary, to put the invention into practice, that the tube 2 and the part 3 are of incompatible rubbers.

The reinforcement of polyolefine of low melt index can also be in the form of a thread, of a reed or of a ribbon rolled as a helix without the coils being joined. Of course, in this case, the reinforcement of polyolefine of low melt index cannot play a role of binding between the different layers of rubber; the latter must therefore be of compatible rubbers.

In other applications, the reinforcements of polyolefine of low melt index can have other forms and be, for example, like plates.

A particularly advantageous application occurs in spring blocks of rubber formed from a mass of rubber clamped between two plates and divided by other plates, parallel to the first ones.

Figure 2:
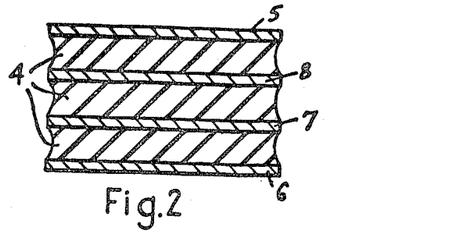
FIG. 2 shows in transverse section another embodiment of the invention, viz. a rubber spring block.

Such a spring is shown in FIG. 2. The mass of rubber 4 is clamped between two rigid plates 5 and 6. Other rigid plates, such as 7 and 8, parallel to the plates 5 and 6, dividing mass 4 of rubber in a manner to confer to the part the desired mechanical characteristic. Springs of this type are, for example, frequently used as support for locomotive motors.

Up to the present, all rigid plates, both those which are placed on both sides of the rubber mass, and those which divide it, have been metallic.

The sensitivity of metal to corrosion, is extremely undesirable in these types of parts.

Moreover, it has been noted that the very high rigidity of the intermediate metallic plates favors for concentration of stresses due to the forces of compression and of shearing. This phenomenon, which results in making the different parts of the mass of rubber work unequally, is extremely awkward; it obliges parts to be oversized and, whatever mixtures of particular types of rubber are used, it shortens the length of the life of the part in service.

On the other hand, it is necessary that these intermediate plates have a certain rigidity so that their inclusion produces the desired effect of modifying the characteristics of rubber springs.

These different problems may be resolved, by producing the spring blocks of rubber in which, at least the intermediate plates which divide the mass of rubber are of polyolefine of low melt index.

In fact, they have an excellent resistance to corrosion and moreover, while having a considerable rigidity, they are less rigid than metal.

Their rigidity may be adjusted to a suitable value so that not too high a localization of tresses is produced and so that the mechanical properties of the spring are those which are desired. For example, their rigidity will be adjusted to the suitable value by means of ribs directed in the one or more directions along which it is desired to obtain a greater rigidity.

In addition, these intermediate plates may be sheathed, for example, with a glass backed fabric of wide mesh or by dispersing glass fiber in their mass.

To produce a similar spring of rubber, for example to that of FIG. 2 in which plates 5 and 6, of steel and 5 mm. thickness, and parts of rubber, each of 17 mm. thicknesses, are separated by intermediate plates, of 7 mm. thicknesses, which are of a Hostalene GU type of polyethylene, there can be used the same process as that used normally for the manufacture of rubber springs of which the intermediate plates are metallic. It must always be noted that while the metallic plates require to receive a particular preparation to be able to adhere to the rubber, polyethylene plates "having a melting index of less than 0.15" have no need of any particular preparation.

The outer metallic plates may also be replaced by plates of polyolefine of low melt index; this is done advantageously each time that the polyolefine will enable a mechanical resistance to be obtained sufficient for the application envisaged.

It is well-known in the manufacture of rubber products to select the rubbers and adapt the formulas of the mixtures into which they enter so that, after vulcanization, they have particular characteristics. But these characteristics are sometimes less than those which would be desirable; thus, the abrasion resistance may be good but insufficient; a mixture may be inert with respect to certain products but sensitive to others although the best would be that it has a general inertness; the coefficient of friction may, in certain applications, be too high.

Polyolefines, which have these characteristics, lack certain other qualities often indispensable, like elasticity, flexibility, which are possessed on the other hand by rubber.

According again to the invention there is provided a rubber product comprising a rubber part modified or coated, partly or wholly, by means of polyolefine of low melt index.

According to another aspect of the invention there is provided a process for making such a rubber product comprising depositing on the object of the rubber, preferably non-vulcanized, a layer of polyolefine of melt index less than 0.15 and bringing the whole to a temperature greater than or equal to 140° C. under a pressure of at least 2 kg./cm.²

By rubber products, there must be understood all products which comprise at least an outer part of a mixture, whether or not vulcanized, comprising one or several synthetic or natural rubbers.

Rubber sheets, whether they do not comprise a reinforcement or do comprise one like rubberized fabrics, are rubber products for which the present invention has a very special advantage.

They would in fact, due to their flexibility and their impermeability, be capable of forming numerous extremely useful articles if on one hand they can be endowed with certain properties, such as chemical inertness and if, on the other hand, the manufacture of articles from these sheets can be industrialized.

The invention bears on these types of products and it consists in the use of polyolefine having a melt index of less than 0.15 to modify or coat objects of rubber or parts of any objects.

It will be noted that the preceding conditions of temperature and pressure are those of vulcanization of numerous rubber products and that in fact there is no particular precaution to be taken or special material to be employed to cause the adherence of the polyolefine.

Moreover, polyolefines of low melt index adhering to all mixtures based on natural or synthetic rubbers, the mixture may be selected solely as a function of its mechanical characteristics of its price without taking into account the qualities that it has at the surface.

In fact, the invention enables the manufacture of products which give a better service and of which the cost is not often greater than that of the same products not comprising this coating.

Although the polyolefines used may be much more rigid than the rubbers, the flexibility of rubber products which are coated therewith is not necessarily appreciably altered. In fact, the thickness of this coating is often relatively small; some 10ths of a millimeter sufficing in many cases.

The layer of polyolefine may be formed in various ways.

The polyolefine of low melt index applied on the rubber so as to form a layer may be in the form of a powder, a sheet or a film, or of a liquid containing particles of the polyolefine held in suspension, but, when this layer is intended to serve as bond between the rubber and another layer of a polyolefine of higher melt index, it is advantageous to effect it by the application of a powder.

It may result from the deposition of a powder of this polyolefine effected, for example, by projection of the powder on the rubber products or by passage of the rubber product into a fluidized bed of this polyolefine powder.

It has also been found that the layer of polyolefine of low melt index modifies the surface properties of rubber articles and enables the latter to become heat sealable.

It has also been found that it is advantageous to modify the surface properties of rubber products, if necessary to render them heat sealable, by means of a layer of a polyolefine of melt index higher than 0.15 bonded to rubber by means of another layer of polyolefine of melt index less than 0.15.

Rubber products according to the invention are manufactured by placing on the rubber, vulcanized or not, the layer of a polyolefine of low melt index, by heating it to a temperature equal or above 140° C. while applying to it a pressure equal or greater than 2 kg./cm.² and cooling it or allowing it to cool to a temperature below 100° C.

If the layer of a polyolefine of low melt index must be covered by another layer of a polyolefine of higher melt index, the procedure is as previously by placing on the rubber the layer of a polyolefine of low melt index, than that of higher melt index, and by heating the assembly to a temperature equal or greater than 140° C. applying thereto a pressure equal or greater than 2 kg./cm.² and cooling it or allowing it to cool to a temperature below 100° C.

In the latter case, according to one particularly advantageous embodiment of the invention, the layer of polyolefine of low melt index results from the application, on the rubber, of a powder of this polyolefine and the layer of polyolefine of higher melt index, from the application of a film of this polyolefine or of a part already formed of this polyolefine.

The heat sealable products of rubber of the invention may then be assembled by heating their layer of polyolefine applying them one against the other by their layer of polyolefine and cooling them or allowing them to cool so that the layers of polyolefine are at a temperature less than or equal to 100° C.

Now the manufacture of articles produced by the assembly of sheets can only be truly industrialized if these sheets are heat sealable; sheets of a thermoplastic material have this advantage but there are numerous applications in which the use of rubber sheets is obligatory by reason of the properties peculiar to rubbers.

The next embodiment relates to sealing joints and to sections intended to rub against a surface.

Sealing joints are in general placed between a fixed part and a part which is normally or accidentally movable. These joints being firmly applied against one of the two parts so that the sealing is as good as possible, it is often necessary, to cause movements of the movable part, to exert considerable forces to overcome at the same time the forces of friction and adherence which, at the end of a certain time, are often only manifested between the joint and the part against which it is applied.

In numerous cases, sealing joints must therefore have a surface of which the coefficient of friction is as low as possible.

Sections intended to rub on a surface must have also a good sliding coefficient and, moreover, a resistance to abrasion as high as possible.

Up to the present it has been sought to confer these characteristics on the surface of the joints and of the sections by effecting the latter in particular mixtures based on rubber.

According to the invention, the characteristics of the surface of joints and sections of rubber are modified by coating them with a layer of polyolefine of low melt index.

EXAMPLE 13

A profile of rubber intended to form a sealing joint is prepared by extrusion of the following mixture:

|  | Parts by weight |
|---|---|
| clear crepe | 100 |
| fatty acid | 2.5 |
| oil plasticizer | 15 |
| chalk | 40 |
| antioxidant | 2 |
| wax | 3 |
| zinc oxide | 5 |
| sulfur | 2.5 |
| dibenzothiazole disulfide | 1.3 |
| dithiocarbonate | 0.2 |

It is then made to pass into a fluidized bed of a powder of polyethylene having a melt index of 0.03 in a manner so that layer of this polyethylene occurs on the section; it can also be enveloped by a thin film of this polyethylene.

Length by length, it passes then into a press in which it is molded and vulcanized at a temperature of 160° C. under a pressure of 5 kg./cm.$^2$.

The product obtained is a conventional section of rubber coated with a thin layer of polyethylene of low melt index. It fulfils the same function of sealing as conventional sections but, contrary to these latter, it does not tend to adhere to the surface with which it is in contact whatever the pressure that is exerted to ensure good sealing.

The next example relates to the production of tubes.

In a general manner the inner wall of tubes must have a very low coefficient of friction so as to avoid pressure losses. There exist also numerous cases especially when the tube is intended for the transport of solids, such as cement, flour, rice or other materials, where the inner wall must, moreover, have a good abrasion resistance. Finally it is useful that this wall has a good chemical inertness, especially when food substances or corrosive substances must be transported.

Up to the present, one is obliged to confer one or other of these different qualities on the inner wall of the tubes by using particular rubbers to constitute it. This involves obviously an increase in price which entails at the same time the use of special qualities of rubber mixtures and difficulties of preparation.

It may also be advantageous for the outer surface of the tubes to have both a good coefficient of friction and a good abrasion resistance.

It has already been proposed to coat the inner wall of a tube with a film of polyethylene. But, the polyethylene concerned being of low molecular weight, its properties, especially its abrasion resistance, are insufficient. Furthermore, whatever the method employed for making it adhere to rubber, for example the use of peroxides or of a layer of hydrogenated polybutadiene, the adherence between this coating of polyethylene and the tube is too slight for the tube to be able to give satisfaction when it is in service.

According to the invention, the inner wall and/or their outer wall are coated by a layer of polyolefine of low melt index so as to confer on them, especially, these qualities.

The layer of polyolefine of low melt index is applied on the inner wall and/or on the outer wall of the tube before the latter is vulcanized; it is then brought to a temperature of at least 140° C. under a pressure of at least 2 kg./cm.$^2$ which causes at the same time the vulcanization and adherence of the polyolefine layer to the wall.

EXAMPLE 14

On a rod having a diameter of 5 cm. there is wound a film of polyethylene of melt index of 0.03 and having a thickness of 0.4 mm. The winding is done in a helix with an overlap of several millimeters between the different windings between them.

On the polyethylene film there is placed, by winding a sheet in a spiral or in any other manner, a layer, having 2 mm. of thickness, of the following mixture of rubber:

|  | Parts by weight |
|---|---|
| SBR extended with oil | 137.5 |
| stearic acid | 1.5 |
| oil plasticizer | 15 |
| zinc oxide | 1.5 |
| antioxidant | 1 |
| black | 15 |
| chalk | 75 |
| sulfur | 2.5 |
| santocure | 1.2 |
| diphenylguanidine | 0.4 |

Subsequently, the fabrication of the tube proceeds using the conventional methods, by placing a core in position.

The tube being fabricated, it is made to pass into a fluidized bed of a powder of the preceding polyethylene in a manner such that its outer surface is entirely covered by a uniform layer of this powder.

The tube is then bound and vulcanized for 10 minutes at 160° C.

The inner wall and the outer wall of the tube obtained, coated thus with a layer of polyethylene of low melt index which adheres strongly to the rubber constituting these walls, having a high chemical inertness with regard to the largest number of materials, a high sliding coefficient and a high abrasion resistance.

In this embodiment, the inner wall and the outer wall of the tube are each coated with a layer of polyolefine. It goes without saying that one could, in the same manner, coat only one of these walls with a layer of polyolefine of low melt index.

Figure 3:
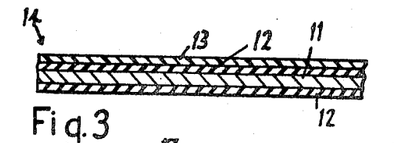
FIG. 3, is a cross section through a heat sealable rubberized fabric.

Referring now to the drawing, the rubberized fabric 14 of FIG. 3 is constituted by a fabric 11 coated on each of faces with a thin layer 12 of rubber. A thin layer 13, of polyolefine of low melt index, which is polyolefine of melt index 0.03 adheres strongly to the layer 12 of rubber of one of the faces of the rubberized fabric; layer 13 of polyolefine has a thickness of 0.05 to 0.25 mm.

To manufacture this rubberized fabric, there are, deposited using therefor known processes and independent of the invention, the layers 12 on the fabric 11 for example by coating or by calandering; by this means there is obtained a fabric 15 of which the faces are covered with a layer of non-vulcanized rubber.

Figure 4:
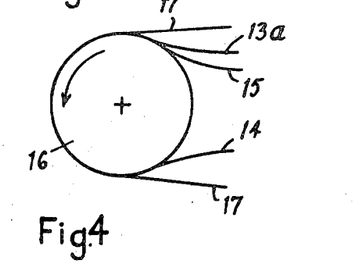
FIG. 4, shows apparatus used for manufacturing the fabric of FIG. 3.

This fabric 15 is then firmly applied on a cylinder 16, FIG. 4, heated to a temperature of 160° C. and driven by a rotary movement around its axis, by means of a stretched hand 17 which is driven by the cylinder 16.

The film 13a of polyethylene, corresponding to the layer 13 of the end fabric shown in FIG. 3, is inserted between the fabric 15 and the band 17; it is driven by the cylinder 16 at the same time as the band 17 and the fabric 15. In the course of this movement, the rubber of the fabric is vulcanized and the film 13a which is heated and applied under pressure on the rubber, adheres to the layer of rubber so that after passage on the heating cylinder, the fabric 14 shown in FIG. 3 is formed.

The tension of the band 17 is such that, during the major part of the passage over the cylinder 16, it is applied on this cylinder under a pressure of the order 3 kg./cm.$^2$, the temperature and the speed of rotation of the cylinder being adjusted in a manner such that the rubber is vulcanized and the film 13 is brought to a temperature of the order of 160° C.

Figure 5:
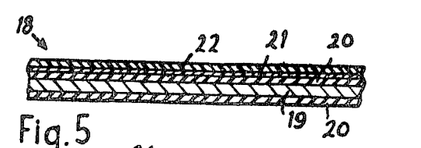
FIG. 5 is, a cross section through another rubberized fabric of which the surface properties have been modified.

The rubberized fabric 18 of FIG. 5 is constituted by a fabric 19 of which the faces are coated by a thin layer 20 of rubber. One of the layers 20 is itself covered with a layer 21 of very thin polyethylene of melt index 0.03 which serves as bond between the layer 20 of rubber and a layer 22, thicker, of polyethylene of melt index 3; the layer 21 has a thickness of 0.05 mm. and the layer 22 a thickness of 0.1 mm.

To produce this fabric there is deposited, by means known independently of the invention, the layer 20 of rubber on the fabric 19 so as to obtain a non-vulcanizable coated fabric 25.

Figure 6:
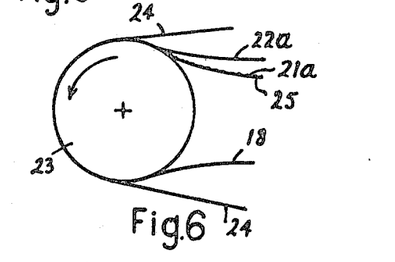
FIG. 6, shows apparatus used for manufacturing the fabric of FIG. 5.

As previously, this non-vulcanized coated fabric is applied by means of a stretched band 24 on a cylinder 23, which turns around its axis and is heated (FIG. 6).

Before the coated and non-vulcanized fabric 25 is introduced into the cylinder 23 and the band 24, there is placed on its upper face the layer of polyethylene of melt index 0.03 in the form of a powder 21a of this polyethylene uniformly distributed; for this, there may be used the well-known techniques of electrostatic deposition or the fabric 25 made to pass into a bath called fluidized where the powder 21a is maintained in suspension in a gaseous current.

A film 22a of polyethylene of melt index 3 is introduced between the fabric 25 and the ban 24.

As previously, the assembly formed by the band 24, the film 22a, the coated and non-vulcanized fabric 25 is driven by the cylinder 23, the band 24 exerting pressure which, ever a larger part of the zone of contact with the cylinder 23, is of the order of 3 kg./cm.$^2$. In the course of this passage over the cylinder 23, the rubber of the fabric 25 is vulcanized, the powder 21a of low melt index polyethylene is transformed into the layer 21 of the finished product and adheres to the rubber while the film 22a of polyethylene of melt index 3 adheres to the layer 21. Thus, in the final product, the layer 22 which was formed by the film 22a adheres strongly to the rubber.

Modification of the surface properties of rubber products by means of a polyolefine of melt index higher than 0.15 bonded to the rubber by a polyolefine of melt index less than 0.15 is advantageous in numerous cases.

In fact, polyolefines of relatively high melt index have, from various points of view, such as chemical inertness or heat sealability, properties as advantageous as polyolefines of low melt index and, on the other hand, do not have certain characteristics of the latter which appear as defects in certain cases.

Thus polyolefines of low melt index being relatively rigid, there is a risk, in certain applications, of stiffening the rubber product beyond acceptable limits. The preceding construction, which consists of only using a polyolefine of low melt index as bonding means between the rubber and a layer of a polyolefine of higher melt index, enables this disadvantage to be offset.

In addition, when it is desired to render articles of rubber heat sealable by means of a layer of polyolefine, it is obviously advantageous to use a polyolefine of which the viscosity is low, that is to say a polyolefine of relatively high melt index. Now, polyolefines of relatively high melt index (higher than 0.15) do not naturally adhere to rubbers; the use of a layer of polyolefine of low melt index as adhesive between the rubber and the polyolefine of higher melt index, enables this problem to be solved.

Polyolefines of low melt index being difficult to form without using a special material and without bringing into use certain processes little used in industry, it is often difficult to obtain a film such as the film 13 of the preceding example of realization It is advantageous, for this reason to use a powder of a polyolefine of low melt index, which enables a thin layer of this polyolefine to be easily produced, and to cover it by a film or a part already formed of a polyolefine of higher melt index.

In the preceding embodiments, the layer of polyolefine was applied over the whole of one face of a rubber product, in this instance a rubberized fabric. It could also be used on two faces or, on the contrary, only on parts intended to be welded.

Instead of making the polyolefine adhere to the rubber when the latter is not vulcanized, it can also be made to adhere to vulcanized or prevulcanized rubber, that is to say which has been subjected to incomplete vulcanization. In the latter case, the heat-treatment necessary to make the polyolefine adhere would also have the effect of bringing about the vulcanization of the rubber.

If the rubber is vulcanized, the temperature and pressure should not generally be less than 160° C. and 5 kg./cm.$^2$ respectively.

To weld the rubber products of the invention, the layer of polyolefine is brought to a temperature above its fusion or softening temperature, the one is applied against the other production to be welded by their part bearing the polyolefine which is in a pasty condition, and they are cooled or allowed to cool to a temperature such that the polyolefine again becomes solid.

Figure 7:
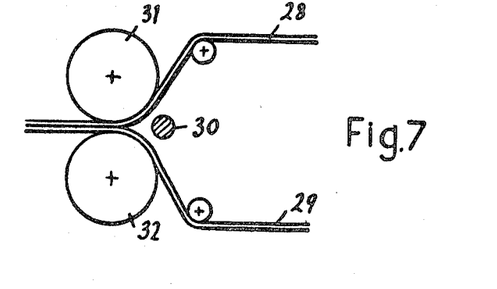
FIG. 7, shows apparatus used for welding together heat sealable rubberized fabrics.

There can, for example, be used for this purpose the device shown in FIG. 7.

Two rubberized fabrics 28 and 29 coated with a layer of polyolefine on one of their faces are heated on this face and on the part through which they must be welded to a temperature of the order of 120° C. if the surface polyolefine is of low melt index and to a temperature of the order of 160° C. if the polyolefine has a higher melt index.

This heating must be carried out by a heating member 30 such as an electrical resistance or a source of infra-red radiation.

Immediately afterwards, the fabrics 28 and 29 are applied against one another by means of two rollers 31 and 32.

In such a device, the temperature to which the layer of polyolefine is brought depends at the same time on the heat dissipated by the heating member 30 and on the speed of advance of the fabrics 28 and 29. A thermocouple may be arranged so as to measure the temperature of the polyolefine layers and to act on the heating member 30 and/or on the speed of advance of the fabrics so that the polyolefine is always at a temperature such that the welding is always correct.

Among the other products to which the invention applies in a particularly advantageous manner, there may be cited flexible reservoirs which could, for example, be manufactured by assembling parts of rubberized fabric coated with a layer of polyolefine by means of a polyolefine of low melt index.

For example in proceeding as previously, a rubberized fabric is coated with a layer of polyethylene of low melt index and of higher melt index and the reservoir is manufactured by the usual means; the reservoir can thus be manufactured by simple and well-known means which are those used for assembling heatweldable sheets.

Of course, the invention is not limited to the preceding examples.

Thus in the case where it is not necessary for the rubber article to have a considerable flexibility, the polyolefine layer may be as thick as desired and this layer of polyolefine can be constituted solely of polyolefine of low melt index or of a layer of polyolefine of low melt index serving as adhesive for a layer of polyolefine of higher melt index.

Also, in the case where the layer of polyolefine results from the application of a film, this film may be prepared as an adhesive product by applying, on one of its faces, a layer of rubber in a manner which offers sufficiently adhesion with regard to the rubber part against which it must be applied and thus the construction of the article is facilitated.

For example, this layer may be applied by passage on a calendar; there is not, in this case, any true adherence between the film and the rubber layer but the conditions of pressure and of temperature cause a sufficient hold to exist of the rubber layer on the polyethylene film.

In the process according to the invention, for the manufacture of assemblies comprising a part of metal or another material and a part of a polyolefine consisting especially of applying on the part of metal or of another material, having if necessary received any suitable treatment to render it adherent to rubber, a layer of a vulcanizable mixture of rubber, applying on this layer of rubber a layer of a polyolefine of low melt index, the assembly is subjected for the necessary time for vulcanization of the rubber, to a temperature at least equal to 140° C. and to a pressure at least equal to 2 kg./cm.².

Polyolefine of low melt index may itself be covered with a polyolefine of higher melt index, the adhesion between one and the other being natural and occurring under the conditions of temperature and of pressure of the operation of the process.

The vulcanizable mixture of rubber, is of course any mixture comprising one or several natural or synthetic rubbers which are vulcanized under the preceding conditions of temperature and that it is known how to make adhere to metal.

The material, such as metal, to which it is desired to adhere the polyolefine may if necessary be treated in any known manner and independently of the invention in a manner to make it adhere to the vulcanizable mixture of rubber used.

These treatments are well-known by those skilled in the art; for metals they consist generally in a surface treatment, like the deposition of copper or of zinc, and/or in the use of a particular adhesive.

The adherence between the polyolefine and the mixture of rubber being generally sufficient whatever the rubber or rubbers entering into this mixture, it is, mostly, advantageous to select this or these rubbers as a function of their aptitude to adhere to the material to which it is desired to bind the polyolefine.

The layer of rubber interposed between the material and the polyolefine must, in general, have at least a thickness of the order of 0.1 mm. This layer can be effected by any known means independently of the invention; it can, for example, be produced by applying a previously prepared film of rubber.

In particular embodiment of the invention, the layer of rubber has a thickness sufficient to confer, on the finished product, particular mechanical characteristics bearing on the presence and on the quality of this layer of rubber.

The layer of polyolefine of low melt index that is caused to adhere to the metal or to another material by means of an adhesive which is a vulcanizable mixture of rubber may, according to its thickness and according to the conditions suitable for the manufacture to be produced, result from the deposition of a powder or of a suspension in a liquid or from the positioning of a film, a sheet, a plate or a previously formed part.

It is, frequently, advantageous that the polyolefine which covers the metal or the other material, has the best possible abrasion resistance; the latter being greater in polyolefines of high molecular weight, that is to say of low melt index, it is then desirable not to cover the polyolefine of low melt index in contact with the layer of rubber by another polyolefine of higher melt index.

In other cases, the layer of polyolefine of low melt index may be covered with another layer of polyolefine of higher melt index; the layer of polyolefine of low melt index only then ensuring the bond between the adhesive constituted by the mixture of rubber and the polyolefine of higher melt index. This enables especially the use of a mixture of rubber as adhesive in all cases where it is desired to use characteristics suitable for such a polyolefine of relatively high melt index which does not adhere to rubber.

In a general manner, the layer of polyolefine of low melt index, which covers the layer of rubber, may itself be coated with a material which adheres thereto. This may, for example, be another rubber which it is not known how to make adhere well to the metal; in this case, the adhesive between this last rubber and the metal is constituted by a layer of rubber in contact with the metal and by the layer of polyolefine of low melt index.

This means enables for example, ethylene-propylene rubbers to be made to adhere, under conditions often very advantageous, to the metal.

As will be seen, certain among the embodiments described below relate to the manufacture of new industrial products which the process according to the invention enables to be produced easily.

Figure 8:
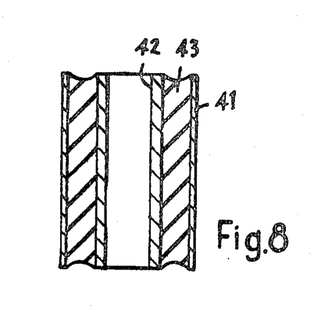
FIG. 8, shows a diagrammatic section across an embodiment of a bush according to the invention.
Figure 9:
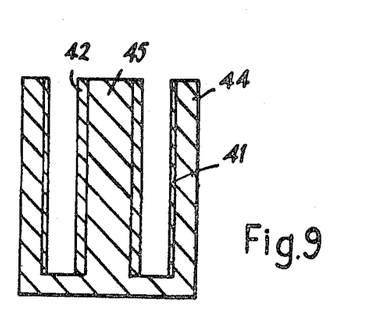
FIG. 9, shows a diagrammatic section across the mold used for the manufacture of the bush of FIG. 8.

The first example, shown in FIGS. 8 and 9, relates to the manufacture of a sliding bush.

In this type of bush, the internal sleeve must be of a material which has and which preserves over time a coefficient of friction as low as possible, this material must also be insensitive to corrosion and be abrasion resistant. Polyolefines, like polyethylenes of low melt index, are particularly suitable but up to the present they have not been used in this application.

The invention facilitates the manufacture of a sleeve, of which the inner sliding bush is of a polyolefine of low melt index. These bushes are new industrial products. The outer sleeve 41 is metallic; the inner sleeve 42, coaxial with the sleeve 41, is of a low pressure polyethylene having a density of 0.94 and a melt index of 0.01 like that known under the commercial designation Hostalen GU. The sleeves 41 and 42 are joined by a layer 43 of rubber.

In bushes known up to the present, the layer of rubber only intervenes to give them particular mechanical characteristics and it was necessary to subject the inner sleeve to certain treatments to make it adhere to the rubber.

On the other hand, in the bush according to the invention, the layer 43 of rubber intervenes not only to confer on the bush particular mechanical characteristics but also to bind the outer sleeve 41 to the inner sleeve 42 without it being necessary to subject the latter, which is a polyethylene of low melt index, to any particular treatment.

Such a bush may be easily manufactured by molding by using, for example, the mold shown in FIG. 9 formed by a cylindrical wall 44 and a center cylindrical core 45, coaxially with the wall 44.

In the space comprised between the wall 44 and 9c the core 45, the outer metallic sleeve 41 is placed adjacent to the wall 44 and the inner sleeve 42 surrounding the core 45.

The metallic sleeve 41 has been subjected to any suitable known treatment, independently of the invention, intended to make it adhere to the layer 43 of rubber. The inner sleeve 42 has been previously produced and it is made of polyethylene known under the commercial designation Hostalen GU.

EXAMPLE 15

In this example, in proceeding by transfer, there is placed between the sleeve 41 and the sleeve 42, the layer 43 of the following vulcanizable mixture of rubber:

|  | Parts by weight |
|---|---|
| natural rubber | 100 |
| black | 55 |
| plasticizer | 5 |
| stearic acid | 1 |
| zinc oxide | 5 |
| antioxidant | 2 |
| sulfur | 2.5 |
| benzothiazole | 1 |

The pressure on the outside of the mold being 25 kg./cm.², it is vulcanized by bringing the whole, which if necessary is subjected to a preheating, to a temperature of 160° C. for 15 minutes.

After removing from the mold, there is obtained the sliding bush shown by FIG. 8. The adhesion between the inner sleeve of polyethylene and the layer of rubber is greater than that which exists between the outer metallic sleeve and the layer of rubber.

To improve the resistance of the polyethylene sleeve, it may be reinforced. For the latter, one could, for example, use a glass fabric of wide mesh or again disperse glass fibers on the inside of the mass, in a manner that the fibers in the mixtures of rubber are called "felts." It is, in fact, to be noted that the presence of glass fibers in the midst of the polyethylene mass of low melt index does not reduce its adherence with regard to rubbers.

The next example relates to the manufacture of metallic skis.

It is known that these types of skis are generally constituted by a metallic sole, generally of a light metal like aluminum or an alloy based on aluminum coated by a sliding surface of a polyethylene of low melt index used on account of its good sliding coefficient and its high abrasion resistance. Up to the present, the fixing of the sliding plate to the metallic sole has only been capable of execution by using complicated processes difficult to put into practice industrially, and which, at the most, do not enable finished products of constant quality to be obtained.

The process according to the invention enables this problem of fixing to be resolved in a particularly advantageous manner.

On the metallic sole, previously treated by a means known in itself, and suitable for rendering adherent to the rubber, there is applied a film of a vulcanizable mixture of rubber and a plate of polyolefine of low melt index; the whole is subjected to conditions of pressure and of temperature of vulcanization of the rubber.

EXAMPLE 16

On the treated metallic sole, there is applied a film having a thickness of 0.3 mm., prepared by calendaring the following mixture:

| | Parts by weight |
|---|---|
| natural rubber | 100 |
| black ISAF | 45 |
| antioxidant | 0.2 |
| zinc oxide | 2 |
| stearic acid | 2 |
| paraffin oil | 2 |
| santocure | 0.7 |
| vulcanizing agent | 1.4 |
| sulphur | 0.7 |

The sliding surface constituted by a plate having 1.5 mm. thickness, made in polyethylene known under the commercial designation Hostalen GU, is applied on the film of rubber.

The whole is placed in a sort of mold; a pressure of 5 kg./cm.² is exerted and, for 20 minutes, it is brought to a temperature of 160° C.

The ski is then withdrawn from the mold.

More flexibility can be given to these types of skis, by giving a greater thickness to the layer of rubber interposed between the metallic sole and the sliding surface of polyethylene. It has been, in fact, noted that this construction gave to the skis characteristics as favorable and even more favorable than that, used up to the present, which consisted in disposing a layer of rubber on the upper part of the skis.

To manufacture these types of skis, it suffices to place on the metallic sole a layer of rubber, having a sufficient thickness to give the ski the desired flexibility.

For example, the process may be as previously using for it a film of rubber having a thickness of 2 mm. in place of 0.3 mm.

Not only does the process of the invention enable the production of new industrial products, but it is also of general application wherever it becomes advantageous to bind a polyolefine to materials, like metals, to which it is known how to make rubber adhere. There may for example be mentioned, coatings of metallic tanks to protect them against corrosion, coatings of leading edges of airplane wings and helicopter blades to protect them against abrasion.

The next example shows how the layer of polyolefine of low melt index can itself be coated with another material adhering to this polyolefine.

EXAMPLE 17

A plate of steel is treated by a known process, for example, by applying successively the products known under the designation Chemosil 211 and Chemosil 220, in a manner to render it adherent to the following vulcanizable mixture of rubber:

| | Parts by weight |
|---|---|
| natural rubber | 100 |
| SRF black | 71 |
| ZnO | 5 |
| stearic acid | 1 |
| plasticizer | 5 |
| antioxidant | 1.2 |
| sulphur | 2.5 |
| mercaptobenzothiazol sulphide | 1.2 |

There is applied, on the treated plate of steel, a sheet of this mixture and a film of polyethylene known under the commercial designation Hostalon GU having a melt index of 0.03; the sheet of rubber mixture and the polyethylene film have each a thickness of 0.4 mm.

On the sheet of Hostalon GU polyethylene of low melt index, there is applied a plate of 5 mm. thickness of a polyethylene known under the commercial designation of Plastylene having a melt index of 3.5.

The whole is taken, under a press, for 15 minutes to a temperature of 160° C. and a pressure of 5 kg./cm.².

In the product obtained, the plate of polyethylene of high melt index adheres so strongly to the plate of steel that during tests there is noted a tearing of the intermediate layer of rubber but never an unsticking of one of the constituents of the assembly.

EXAMPLE 18

On an identical plate of steel, treated in the same fashion, there is disposed an identical sheet of rubber and an identical film of Hostalen GU. On the latter there is applied a plate, having a thickness of 5 mm., of the following mixture:

| | Parts by weight |
|---|---|
| ethylene-propylene rubber Dutral N | 100 |
| plasticizer | 10 |
| antioxidant | 0.5 |
| black SAF | 60 |
| tertiary butyl peroxide | 3.6 |
| sulphur | 0.6 |

The whole is taken for 15 minutes to a temperature of 160° C. and to a pressure of 5 kg./cm.².

The sheet of ethylene-propylene rubber adheres strongly to the plate of steel from which it cannot be unglued.

Among the other applications of the invention, there may be mentioned the coating of reservoirs or metallic tanks to protect them against corrosion and against the attack of the products that they contain.

The process of the invention may be used for adhering, with respect to polyolefines, any material that it is known how to adhere to rubber.

For example, if it is desired to reinforce a product of polyolefine with a sheathing, the latter will be adhered with regard to the rubber and it is coated with a thin layer of vulcanizable rubber mixture.

EXAMPLE 19

A glass fabric which has been adhered with respect to rubber by the supplier, is coated, by passage on a calendar with a thin layer of the mixture of which the composition, expressed in parts by weight, is the following:

| | |
|---|---|
| natural rubber | 100 |
| FEF black | 35 |
| plasticizer | 10 |
| stearic acid | 1.5 |
| zinc oxide | 5 |
| antioxidant | 2 |
| sulphur | 2.5 |
| tetramethylthiurame disulphide | 1.3 |

It is used to reinforce the inner part, of polyolefine of low melt index, of the bush previously described. The adherence between this fabric and the polyolefine is excellent, separation being produced at the bond between the glass fabric and the layer of rubber.

In the same manner, there may be rendered adherent any textile, natural, artificial or synthetic or metallic with regard to polyolefines and thus, use them, as reinforcement of articles or parts of articles of polyolefine.

The low melt index polyethylene used in any of the above-described processes is preferably applied in the form of powder or of film, depending, of course, upon the conditions of use.

It will be clear that various other changes and modifications may be made in the embodiments described above without departing from the essential concept of invention as described in scope by the appended claims.

We claim:

1. A method for bonding a rubber vulcanizable by a vulcanizing agent other than a peroxide to a polyolefine selected from the group consisting of polymers and copolymers of one and more mono-olefines having not more than four carbon atoms and mixtures of these polymers and copolymers, which consists in selecting a said polyolefine having a melt index of less than 0.15 when measured according to the standard ASTM 1238–57 T modified by adding a supplementary load of 3 kg., contacting said rubber and said selected polyolefine, and applying pressure and heat, the rubber being vulcanized by a vulcanizing agent other than a peroxide at the latest during said application of pressure and heat.

2. A method for bonding two rubbers by the method as claimed in claim 1, which consists in positioning said selected polyolefine between and in contact with both said two rubbers, and subjecting the assembly to heat and pressure, at least one of said two rubbers being vulcanized by a vulcanizing agent other than a peroxide.

3. A method according to claim 1, wherein said selected polyolefine is polyethylene.

4. A method for bonding a rubber to a polyolefine of melting index greater than 0.15, when measured by the method set forth in claim 1, by the method claimed in claim 1, which consists in positioning said selected polyolefine having a melting index less than 0.15 between and in contact with said rubber and said polyolefine of melting index greater than 0.15, and subjecting the assembly to heat and pressure, said rubber being vulcanized by a vulcanizing agent other than a peroxide.

5. A method according to claim 1, wherein the polyolefine of melting index less than 0.15 is in a form of powder.

6. A method according to claim 1, wherein said rubber is in the form of an unvulcanized rubber mix, a sulphur-containing vulcanizing agent is present, and the temperature and pressure are of magnitude and duration sufficient to cause vulcanization of the rubber.

7. A method according to claim 6, wherein the pressure is at least 2 kg./cm.$^2$.

8. A method according to claim 1, wherein the rubber is partly vulcanized previous to said bonding and the pressure is less than 10 kg./cm.$^2$ and the polyolefine is heated to at least its melting point.

9. A method according to claim 1, wherein the rubber has been vulcanized prior to contacting it with the selected polyolefine the applied pressure being at least 10 kg./cm.$^2$, and the temperature is sufficient to soften the polyolefine.

10. A method according to claim 6, wherein the vulcanizing agent is, a material having a sulphur base and a metal oxide.

11. A composite product comprising at least two elements bonded in contact to one another, one said element being of rubber vulcanized by a sulphur-containing vulcanizing agent and the other of said two elements being a polyolefine selected from the group consisting of polymers and copolymers of one and more mono-olefines having not more than four carbon atoms and mixtures of these polymers and copolymers and having a melting index of less than 0.15 when measured according to the standard ASTM 1238–57 T modified by adding a supplementary load of 3 kg.

12. A tube comprising a composite product according to claim 11.

13. Method according to claim 1, wherein the layer of polyolefine is applied in contact with the rubber in the form of a suspension of particles not exceeding a size of 100$\mu$ of said selected polyolefine of melting index less than 0.15.

14. A product according to claim 11, comprising at least one part of rubber and at least one part of a polyolefine of low melt index in which the polyolefine is a reinforcement.

15. A product as claimed in claim 14, wherein the reinforcement of polyolefine is in the form of a continuous layer.

16. A product according to claim 14, wherein the reinforcement of polyolefine is in the form of a helix of which the coils are not adjacent.

17. A product according to claim 11, wherein said rubber element is in the form of a sheet at least part of the surface of which has a layer of said selected polyolefine of melting index less than 0.15 in contact with and bonded to the rubber surface of said sheet.

18. A product according to claim 12, wherein the outer wall of the tube is coated with said polyolefine.

19. A product according to claim 12, wherein the inner wall of the tube is coated with said polyolefine.

20. A product according to claim 17, wherein said layer of said selected polyolefine of melting index less than 0.15 has bonded on at least part of its surface remote from the rubber sheet a layer of a polyolefine of higher melting index.

21. A product according to claim 17, wherein said rubber sheet is a rubberized fabric.

22. A process of manufacturing a product according to claim 1, wherein the layer of polyolefine is applied on the rubber sheet before vulcanization, and then the whole is brought to a temperature equal or greater than 140° C. under a pressure equal or greater than 2 kg./cm.$^2$.

23. A process according to claim 22, including applying the polyolefine of low melt index in the form of a film.

24. A process according to claim 22, including placing on the layer of polyolefine of low melt index, a layer of a polyolefine of higher melt index, and subjecting the assembly to a temperature equal to or greater than 140° C. and to a pressure greater than or equal to 2 kg./cm.$^2$.

25. A process according to claim 22, including applying the layer of polyolefine of low melt index as a powder to the rubber and placing on said layer of powder, a film or a part already formed of a polyolefine of higher melt index, and subjecting the assembly then to a temperature equal to or greater than 140° C. and to a pressure greater than or equal to 2 kg./cm.$^2$.

26. A product according to claim 11 wherein said rubber element is bonded to a metal element by a part of its surface which is not bonded to said selected polyolefine having a melting index less than 0.15.

27. The process of claim 1, in which said polyolefin contains a thickening agent.

28. The process of claim 1, in which said polyolefin contains a wetting agent.

29. The process of claim 1, in which said polyolefin contains as a suspending medium a liquid selected from the group consisting of acetone and methanol.

30. The process of claim 24, in which said layer of polyolefine of higher melt index is an ethylene-propylene polymer.

* * * * *